Dec. 14, 1954     C. F. CONDER ET AL     2,696,694
LURE
Filed Oct. 6, 1952

INVENTORS.
Christopher F. Conder
and William R. Elliott
BY W. B. Harpman
ATTORNEY.

United States Patent Office 2,696,694
Patented Dec. 14, 1954

2,696,694

LURE

Christopher F. Conder, Fairport, and William R. Elliott, Poland, Ohio

Application October 6, 1952, Serial No. 313,272

3 Claims. (Cl. 43—42.48)

This invention relates to a lure and more particularly to a lure incorporating novel means of carrying fish hooks and/or clusters thereby.

The principal object of the invention is the provision of a fish lure of a desirable shape incorporating improved constructional features with respect to the mounting thereon of clusters of fish hooks.

A further object of the invention is the provision of a fish lure of an improved shape incorporating a fin of undulating shape.

A still further object of the invention is the provision of a fish lure of the so-called "flat fish" type incorporating an improved shape and means for mounting fish hooks thereon, the shape being such as to more effectively position the hooks regardless of the position of the lure in the water.

A still further object of the invention is the provision of a fish lure which can be inexpensively and rapidly formed of molded parts incorporating buoyant chambers.

A still further object of the invention is the provision of a fish lure that may be formed of oppositely disposed matching molded parts incorporating buoyant chambers in assembled relation and means pivotally supporting a fish hook carrying member.

The fish lure disclosed herein comprises an improvement in the art of lures and specifically that of the so-called "flat fish" type of lure which is adapted to be cast by the fisherman and drawn through the water following the cast. Such flat fish lures and other types of lures and plugs as have been heretofore proposed have had a common objection in that they were intended for and useful primarily when they traveled through the water in an upright position with a definite top side and bottom side and a corresponding matching mounting of the fish hooks or clusters thereof.

Obviously a lure when cast will not necessarily strike the water in a definite upright position nor is it likely that it will assume such an arbitrary position when drawn through the water following the cast. For this reason many lures are unsuccessful as the hooks are misplaced with respect to the lure body and the lure itself does not function as intended.

The present lure is so formed that it functions efficiently and places the hooks in a highly desirable location in relation thereto regardless of its position in the water in either upright or upside down position. The lure is, therefore, more likely to attract a successful strike and more likely to hook the fish striking the same.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
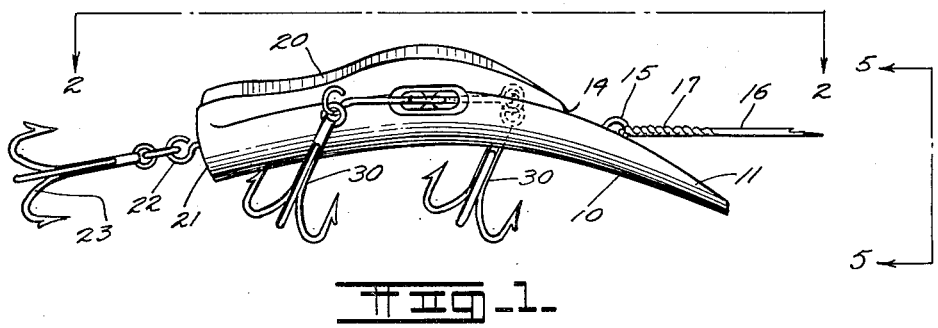
Figure 1 is a side elevation of the fish lure.

By referring to the drawings and Figure 1 in particular it will be seen that the lure comprises an elongated arcuate body generally indicated by the numeral 10, the right end portion thereof comprising the leading or front end and formed with a transversely arcuate bill-shaped projection 11, the upper surface 12 of which is transversely and longitudinally concave from the forward end thereof to a point inwardly therefrom where spaced upwardly curving surfaces 13 lead to the upper surface of the lure 10.

A central flattened area 14 positioned between the surfaces 13 has an eyelet 15 secured thereto, to which eyelet a line 16 incorporating a loop 17 is preferably attached. The line 16 and loop 17 may obviously be so assembled as to provide a swivel action at this point if desired.

Figure 3:
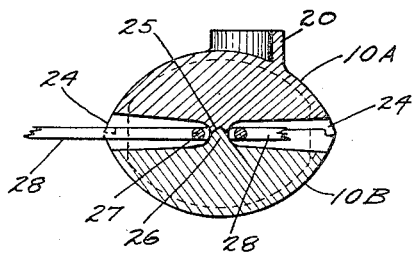
Figure 3 is a vertical section taken on line 3—3 of Figure 2.
Figure 4:
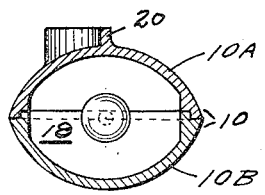
Figure 4 is a vertical section taken on line 4—4 of Figure 2.
Figure 5:
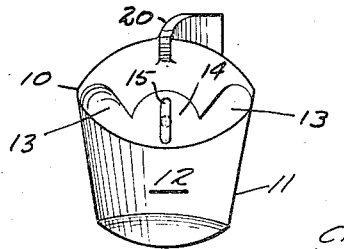
Figure 5 is a front end view taken on line 5—5 of Figure 1.

The body 10 of the lure is preferably formed of an upper and a lower section or portion, as best shown in Figures 3 and 4 and indicated thereon by the numerals 10A and 10B, respectively. These upper and lower sections or portions 10A and 10B are preferably formed as a plastic molding with matching registering sections along their peripheral edges and adapted to be secured to one another through the use of a suitable cement, as known in the art.

Figure 2:
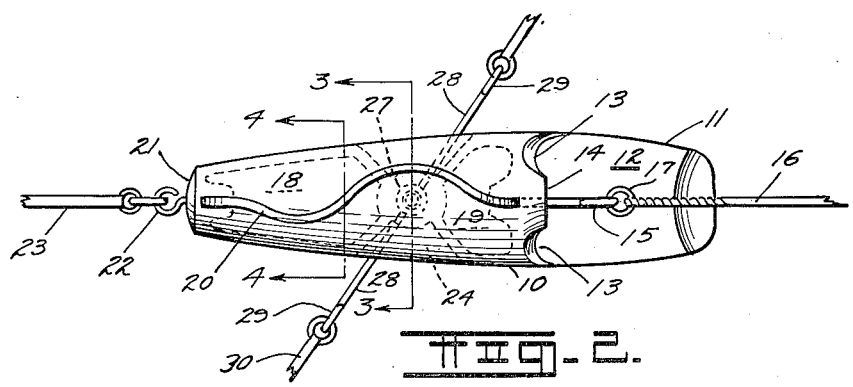
Figure 2 is a top elevation with dotted lines indicating the position of cavities and chambers therein.

The upper and lower sections or portions 10A and 10B are hollow so that together they form buoyant chambers 18 and 19 therein, as best shown in Figure 2 of the drawings by the dotted line, and in the cross section comprising Figure 4 to render the lure buoyant. It will be observed that the shape of the lure is such that it will normally be positioned beneath the surface of the water through which it is drawn despite its buoyancy.

The upper portion 10A of the lure has an integrally formed fin 20 of undulating shape thereon starting at a point adjacent the area 14 in which the eyelet 15 is positioned and terminating adjacent the rear end 21 of the lure. The fin, while preferably integrally formed with the upper portion 10A, and it will be observed that the fin 20 includes at least one major outwardly curving section toward either side of the lure to cause the same to move through the water with a motion similar to that of a swimming minnow or the like.

It will further be seen that the fin 20 will be operative for its intended purpose whether the lure rests in the water with the fin 20 up or down. An eyelet 22 is attached to the rear end of the lure 21 and a cluster of hooks 23 is secured thereto in a conventional manner. The upper and lower sections or portions 10A and 10B of the lure are formed with a transverse tunnel 24 therein extending through the lure transversely and communicating with the atmosphere on either side thereof. The tunnel 24 is relatively wider than its height and of greater width at its outer side portions than at its central part, the same having front and rear inclined walls as shown in Figure 2. The upper and lower portions 10A and 10B are provided with downwardly and upwardly projecting sections 25 and 26 arranged for interengagement, as best shown in Figure 3, each of the projections 25 and 26 being substantially conical in over all shape, as best shown in Figure 1, and whereby a centrally located vertical pivot pin is formed and the middle portion of which is of lesser diameter than the upper and lower portions thereof.

The central pivot thus formed by the projections 25 and 26 when the portions 10A and 10B are assembled provides for the reception and retention of a ring 27 which has a pair of oppositely disposed outwardly extending arms 28—28 thereon, said ring and arms constituting a hook carrying member that is mounted for swinging movement substantially horizontally, the form of the tunnel 24 being such as to provide for limited swinging movement of the hook carrying members, each of the arms being eyeleted at its outermost end as at 29—29 and adapted to receive eyeleted hook clusters 30—30, as best shown in Figures 1 and 2 of the drawings.

It will be observed that due to the formation of the tunnel 24 of greater width that its height and the central location of the projections 25 and 26, the arms 28—28 will effectively pivot thereabout by reason of their attachment to the ring 27 and be capable of movement within the limits of the tunnel 24.

It will further be seen that when the lure lands in the water, as upon being cast, in upright position, the hook clusters 30—30 will fall in the position shown in Figure 1. It will be seen that when the lure lands in upside down position, the hook clusters will maintain a generally depending position and at all times in the same relative location with respect to the body of the lure itself.

It will be thus seen that the lure disclosed herein provides a unique transverse mounting of the arms 28 upon which the hook clusters 30—30 are mounted, that the fin 20 provides a desirable motion when the lure is drawn through the water and desirably characterizes the appearance of the lure and further that the bill-shaped projection 11 forming the front end of the lure creates an effective step on the leading edge of the lure in conjunction with the surfaces 13.

It will thus be seen that the lure disclosed herein meets the several objects of the invention.

Having thus described our invention, what we claim is:

1. A fishing lure including an elongated body having intermediate its ends a tunnel extending substantially horizontally transversely therethrough, said tunnel having transversely extending front and rear inclined walls located inwardly of the ends of the body, a vertically extending pivot within said tunnel substantially centrally of the sides of the body, an elongated hook carrying member movably engaged substantially centrally of its ends with said pivot for swinging movement substantially horizontally relative to the body, said member extending transversely of the body and outwardly from both sides thereof, said tunnel being of a width whereby its inclined walls provide for limited swinging movement of the hook member, and a fish hook suspended from each end portion of said hook carrying member.

2. A fishing lure of the construction set forth in claim 1, and wherein the body is formed of upper and lower longitudinal sections secured together and wherein vertical extensions of each of said sections are disposed opposite each other in abutting relation to jointly form said pivot.

3. A fishing lure of the construction defined in claim 1 and wherein the hook carrying member comprises a ring engaging said pivot and a pair of arms extending radially outwardly at opposite points from said ring and substantially rigidly secured thereto at their inner end portions.

References Cited in the file of this patent

UNITED STATES PATENTS

| Number | Name | Date |
|---|---|---|
| 800,536 | Bailey et al. | Sept. 26, 1905 |
| 841,429 | Passage | Jan. 15, 1907 |
| 1,462,949 | Walls | July 24, 1923 |
| 1,727,936 | Pflueger | Sept. 10, 1929 |
| 2,033,829 | Helin | Mar. 10, 1936 |
| 2,112,385 | Smith | Mar. 29, 1938 |
| 2,159,230 | Sage | May 30, 1939 |
| 2,515,103 | Townsend | July 11, 1950 |
| 2,527,468 | Turner | Oct. 24, 1950 |
| 2,598,771 | Eder | June 3, 1952 |